US009280541B2

(12) United States Patent
Fried et al.

(10) Patent No.: US 9,280,541 B2
(45) Date of Patent: Mar. 8, 2016

(54) QR DATA PROXY AND PROTOCOL GATEWAY

(71) Applicant: Five9, Inc., San Ramon, CA (US)

(72) Inventors: Lance Fried, Aventura, FL (US); Joseph Katz, Atlanta, GA (US)

(73) Assignee: Five9, Inc., San Ramon, CA (US)

( * ) Notice: Subject to any disclaimer, the term of this patent is extended or adjusted under 35 U.S.C. 154(b) by 347 days.

(21) Appl. No.: 13/736,788

(22) Filed: Jan. 8, 2013

(65) Prior Publication Data

US 2013/0179156 A1 Jul. 11, 2013

Related U.S. Application Data

(60) Provisional application No. 61/584,575, filed on Jan. 9, 2012.

(51) Int. Cl.

| | |
|---|---|
| *G10L 19/00* | (2013.01) |
| *G06F 17/30* | (2006.01) |
| *G10L 21/00* | (2013.01) |
| *G06Q 30/06* | (2012.01) |
| *G06Q 30/02* | (2012.01) |
| *G06Q 30/00* | (2012.01) |
| *H04L 29/08* | (2006.01) |

(52) U.S. Cl.
CPC ...... *G06F 17/30002* (2013.01); *G06F 17/3005* (2013.01); *G06Q 30/016* (2013.01); *G06Q 30/0269* (2013.01); *G06Q 30/0641* (2013.01); *G10L 21/00* (2013.01); *H04L 67/327* (2013.01)

(58) Field of Classification Search
USPC .......................................... 704/201, 203, 206
See application file for complete search history.

(56) References Cited

U.S. PATENT DOCUMENTS

| | | |
|---|---|---|
| 3,656,148 A | 4/1972 | Belcher et al. |
| 4,585,906 A | 4/1986 | Matthews et al. |
| 4,602,129 A | 7/1986 | Matthews et al. |
| 4,789,928 A | 12/1988 | Fujisaki |
| 5,027,387 A | 6/1991 | Moll |

(Continued)

FOREIGN PATENT DOCUMENTS

| | | |
|---|---|---|
| WO | 2010126860 A1 | 11/2010 |
| WO | 2011146776 A1 | 11/2011 |

OTHER PUBLICATIONS

Extended European Search Report dated Jul. 13, 2015 from related/corresponding European Patent Application 13735897.4 filed Jan. 9, 2013.

(Continued)

*Primary Examiner* — Leonard Saint Cyr
(74) *Attorney, Agent, or Firm* — Jones Day

(57) ABSTRACT

A quick response (QR) proxy and protocol gateway for interfacing with a carrier network, a QR-equipped device, and a contact center and contact center database is disclosed. A data link is connected to a carrier network to receive QR codes and other data. Additional data links are connected to a contact center database and a QR-equipped device to obtain information used in determining routing and tagging instructions. A user interface is connected to the gateway to accept configurable conditions for determining routing instructions. There is a text conversion function and speech conversion function for each target enterprise contact center. Synchronization between stored user preferences to automated or semi-automated customer service routes is provided by a consumer preference template system.

12 Claims, 4 Drawing Sheets

(56) References Cited

U.S. PATENT DOCUMENTS

| | | |
|---|---|---|
| 5,046,088 A | 9/1991 | Margulies |
| 5,127,043 A | 6/1992 | Hunt et al. |
| 5,311,574 A | 5/1994 | Livanos |
| 5,377,191 A | 12/1994 | Farrell et al. |
| 5,457,683 A | 10/1995 | Robins |
| 5,627,884 A | 5/1997 | Williams et al. |
| 5,655,007 A | 8/1997 | McAllister |
| 5,835,565 A | 11/1998 | Smith |
| 5,870,723 A | 2/1999 | Pare et al. |
| 5,915,001 A | 6/1999 | Uppaluru |
| 5,940,476 A | 8/1999 | Morganstein et al. |
| 5,960,411 A | 9/1999 | Hartman et al. |
| 5,970,065 A | 10/1999 | Miloslavsky |
| 6,009,469 A | 12/1999 | Mattaway et al. |
| 6,186,406 B1 | 2/2001 | Ackley |
| 6,253,075 B1 | 6/2001 | Beghtol et al. |
| 6,275,490 B1 | 8/2001 | Mattaway et al. |
| 6,324,519 B1 | 11/2001 | Eldering |
| 6,359,971 B1 | 3/2002 | Haimi-Cohen |
| 6,466,917 B1 | 10/2002 | Goyal et al. |
| 6,496,501 B1 | 12/2002 | Rochkind |
| 6,496,855 B1 | 12/2002 | Hunt et al. |
| 6,516,056 B1 | 2/2003 | Justice et al. |
| 6,529,717 B1 | 3/2003 | Blants |
| 6,563,921 B1 | 5/2003 | Williams et al. |
| 6,697,858 B1 | 2/2004 | Ezerzer et al. |
| 6,704,412 B1 | 3/2004 | Harris et al. |
| 6,840,450 B2 | 1/2005 | Schuessler |
| 6,850,901 B1 | 2/2005 | Hunter et al. |
| 6,934,381 B1 | 8/2005 | Klein et al. |
| 6,944,278 B1 | 9/2005 | Nielsen |
| 7,039,609 B2 | 5/2006 | Aoki |
| 7,103,576 B2 | 9/2006 | Mann, III |
| 7,110,976 B2 | 9/2006 | Heimermann et al. |
| 7,149,208 B2 | 12/2006 | Mattaway et al. |
| 7,200,570 B1 | 4/2007 | Wu |
| 7,224,778 B2 | 5/2007 | Aoki |
| 7,269,431 B1 | 9/2007 | Gilbert |
| 7,330,876 B1 | 2/2008 | Rawat et al. |
| 7,373,319 B2 | 5/2008 | Kopelman |
| 7,383,231 B2 | 6/2008 | Gupta et al. |
| 7,386,101 B2 | 6/2008 | Pugliese |
| 7,395,319 B2 | 7/2008 | Harris et al. |
| 7,412,412 B2 | 8/2008 | Buxton et al. |
| 7,433,967 B2 | 10/2008 | Anson |
| 7,437,331 B1 | 10/2008 | Rosenberger |
| 7,444,297 B2 | 10/2008 | Shah |
| 7,447,646 B1 | 11/2008 | Agarwal et al. |
| 7,461,024 B2 | 12/2008 | Montgomery |
| 7,464,155 B2 | 12/2008 | Mousavi |
| 7,464,342 B2 | 12/2008 | Savage et al. |
| 7,468,729 B1 | 12/2008 | Levinson |
| 7,477,729 B2 | 1/2009 | Bell |
| 7,484,176 B2 | 1/2009 | Blattner et al. |
| 7,487,124 B2 | 2/2009 | Boutilier |
| 7,490,056 B2 | 2/2009 | Nash |
| 7,490,063 B2 | 2/2009 | Garrison et al. |
| 7,490,135 B2 | 2/2009 | Klug et al. |
| 7,496,943 B1 | 2/2009 | Goldberg et al. |
| 7,505,935 B2 | 3/2009 | Mendiola |
| 7,509,272 B2 | 3/2009 | Bailey et al. |
| 7,512,548 B1 | 3/2009 | Bezos et al. |
| 7,519,671 B2 | 4/2009 | Ho |
| 7,529,692 B1 | 5/2009 | Lynch |
| 7,802,723 B2 | 9/2010 | Petrone et al. |
| 7,881,469 B2 | 2/2011 | Eberwein et al. |
| 8,045,687 B2 | 10/2011 | Ueshima |
| 8,061,602 B1 | 11/2011 | Oakes, III |
| 8,061,615 B2 | 11/2011 | Yada et al. |
| 8,069,169 B2 | 11/2011 | Fitzpatrick et al. |
| 8,073,257 B2 | 12/2011 | Uchikawa |
| 8,213,911 B2 | 7/2012 | Williams et al. |
| 8,332,323 B2 * | 12/2012 | Stals et al. ............ 705/44 |
| 2002/0035539 A1 | 3/2002 | O'Connell |
| 2003/0018702 A1 | 1/2003 | Broughton et al. |
| 2003/0069922 A1 | 4/2003 | Arunachalam |
| 2003/0154125 A1 | 8/2003 | Mittal et al. |
| 2004/0128197 A1 | 7/2004 | Barn et al. |
| 2004/0167911 A1 | 8/2004 | Wakefield et al. |
| 2004/0185825 A1 | 9/2004 | Preiss et al. |
| 2005/0038893 A1 | 2/2005 | Graham |
| 2006/0080106 A1 | 4/2006 | Calderone et al. |
| 2006/0095568 A1 | 5/2006 | Makagon et al. |
| 2006/0167753 A1 | 7/2006 | Teague et al. |
| 2006/0190354 A1 | 8/2006 | Meisel et al. |
| 2007/0026875 A1 * | 2/2007 | Nomura et al. ............ 455/458 |
| 2007/0060114 A1 | 3/2007 | Ramer et al. |
| 2007/0071223 A1 | 3/2007 | Lee et al. |
| 2007/0133522 A1 | 6/2007 | Morgan |
| 2007/0192198 A1 | 8/2007 | Schwarz |
| 2008/0004976 A1 | 1/2008 | Beachum et al. |
| 2008/0130843 A1 | 6/2008 | Ueshima |
| 2008/0201225 A1 | 8/2008 | Maharajh et al. |
| 2008/0245870 A1 | 10/2008 | Lee et al. |
| 2008/0281910 A1 | 11/2008 | Trioano et al. |
| 2009/0234711 A1 | 9/2009 | Ramer et al. |
| 2010/0057586 A1 * | 3/2010 | Chow ............ 705/26 |
| 2010/0080383 A1 * | 4/2010 | Vaughan et al. ............ 380/44 |
| 2010/0246797 A1 | 9/2010 | Chavez et al. |
| 2010/0257098 A1 | 10/2010 | Mann, III et al. |
| 2010/0293560 A1 | 11/2010 | Bland et al. |
| 2010/0325442 A1 | 12/2010 | Petrone et al. |
| 2011/0034176 A1 | 2/2011 | Lord et al. |
| 2011/0110364 A1 | 5/2011 | Fried et al. |
| 2011/0112901 A1 | 5/2011 | Fried et al. |
| 2011/0125826 A1 | 5/2011 | Erhart et al. |
| 2011/0202471 A1 * | 8/2011 | Scott et al. ............ 705/306 |
| 2012/0223131 A1 * | 9/2012 | Lim et al. ............ 235/375 |
| 2012/0295596 A1 | 11/2012 | Camulli et al. |

OTHER PUBLICATIONS

International Search Report and Written Opinion for International Application No. PCT/US 13/20756; 9 Pages, Jan. 9, 2013.

\* cited by examiner

QR DATA PROXY AND PROTOCOL GATEWAY

CROSS-REFERENCE TO RELATED APPLICATIONS

This application relates to and claims the benefit of U.S. Provisional Application No. 61/584,575 filed Jan. 9, 2012 and entitled QR DATA PROXY AND PROTOCOL GATEWAY the entire content of which is wholly incorporated by reference herein.

STATEMENT RE: FEDERALLY SPONSORED RESEARCH/DEVELOPMENT

Not Applicable

BACKGROUND

1. Technical Field

The present disclosure relates generally to telecommunications systems, and more particularly, to a gateway that converts Quick Response (QR) scans into actionable routing and personal preference templates that can be used for product selection and purchases, customer service, and other transactional routing instructions dealing with consumer preferences.

2. Related Art

Originating from industrial uses involving the tracking of manufactured components, QR (quick response) codes now find commercial applications in advertising. As will be recognized, QR codes are comprised of a pattern of square dots arranged to represent some information, as opposed to the simple sequence of thin and thick lines of the common bar code. Typically, QR codes are printed on advertising material, and upon being scanned by a user of a communications device such as a Smartphone, is operative to direct the user to a website associated with the advertising material. There are other standardized barcode type modalities known in the art developed in competition with QR codes, such as Microsoft Tag, Data Matrix Code, JAGTAG, and so forth. Along these lines, various vendors such as ShareSquare, JagTag, Esponce, and Liqueo produce reading and encoding solutions that are widely used by advertisers and consumers alike.

The conventional application of QR codes involves the aforementioned advertisement to webpage redirection, as well as to those associated with traditional barcodes such as inventory tracking, shopping, fare (transportation) tracking. Accordingly, there is a need in the art to enhance such standard modalities of QR scanning by matching consumer preferences, privacy information, vendor-specific preferences and other highly personal data. There is also a need in the art for running stored programs and associated scripts of a customer service nature based upon QR code input.

BRIEF SUMMARY

The present disclosure contemplates a QR data proxy and protocol gateway that has input ports to receive QR scans and user data and output ports to facilitate highly personalized and preference-based transactions on behalf of the consumer. Such transactions may include automated purchases, credits, shipping instructions, personal preference information such as color and size of a product, shipping information and customer service profile information that can be used in the establishment of real time and non-real time sessions between the consumer and a customer service agent.

Besides standardized QR codes, other similar coding schemes such as data matrix and JAGTAG may be used. QR codes or equivalent scans submitted by applications running on SmartPhones, digital cameras, or other capable end user devices may be deciphered. Once deciphered, the QR code scan can relate to one or more elements of user data collected by directly querying the end user and/or by passing data collected automatically by an application that is resident on the end user device.

There is also contemplated a service creation environment that uses templates for creating customer service-oriented automated scripts and for obtaining user data and passing user and QR code related data back and forth between the consumer and the enterprise. The enterprise can thus configure conditional rules to determine what action should be taken based on the receipt of a particular QR code scan with or without an associated set of user data. These rules can be designed to accommodate a variety of business environments and can be flexibly adjusted over time as needed.

The service creation environment can also dynamically generate QR codes. This process allows the enterprise to create QR codes with unique attributes based on collected data and/or conditional rules that have been established. These dynamic QR codes can be distributed to a variety of applications, and when scanned by an end user, can be recognized by the QR data proxy and protocol gateway to have associated contact center routing scripts.

The gateway also includes a set of output ports that can be used to connect to an enterprise contact center resource including interactive voice response (IVR), automatic contact distributor (ACD), and intelligent routing systems. A separate set of output ports can be used to connect to end users via addressable methods such as phone numbers or IP addresses. In this manner, customer service sessions as dictated by the contact center routing scripts can be automatically established. Once the customer service session is established, the QR data proxy and protocol gateway may remain connected to perform service control functions (quality monitoring, transfers, etc.) or may disconnect and allow for a direct session between the contact center and the end user.

The QR data proxy and protocol gateway may employ a media server function that can assist in executing the contact center routing scripts by presenting audio signals to the contact center resource and/or back to the end user device. These audio signals can simulate call progress tones, menu selections (DTMF sounds or voice output), music on hold, announcements, or other call related functions.

In accordance with commonly available protocols and devices that may act as proxies for those protocols, the QR data proxy and protocol gateway may be utilized to convert automated customer-service oriented scripts into proprietary data instructions, SMS transmissions, chat sessions, emails, or telephone-based communications. The QR data proxy and protocol gateway may be utilized as a shared network device, such that each gateway holds and executes customer service-oriented scripts on behalf of a plurality of enterprise contact center resources. The QR data proxy and protocol gateway can be deployed also as a dedicated device where it is co-located with the enterprise contact center resource(s). The functions of the QR data proxy and protocol gateway may be divided among multiple physical devices thus accommodating geographical diversity, redundancy, and/or allowing third party devices to perform certain functions in lieu of the gateway itself.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and the detailed description to indicate the same elements.

DETAILED DESCRIPTION

The detailed description set forth below in connection with the appended drawings is intended as a description of the presently preferred embodiment of a QR data proxy and protocol gateway. and is not intended to represent the only form in which the present method may be developed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities. The present disclosure relates to U.S. patent application Ser. No. 12/767,544 entitled "Secure Customer Service Proxy Portal" filed Apr. 26, 2010, U.S. patent application Ser. No. 12/772,894 entitled "Trust-Based Personalized Offer Portal" filed May 3, 2010, U.S. patent application Ser. No. 13/594,356 entitled "Network Predictive Customer Service Queue Management" filed Aug. 24, 2012, and U.S. patent application Ser. No. 13/604,929 entitled "Social Proxy and Protocol Gateway" filed Sep. 6, 2012, the entire contents of each disclosure of which are hereby wholly incorporated by reference herein.

Figure 1:
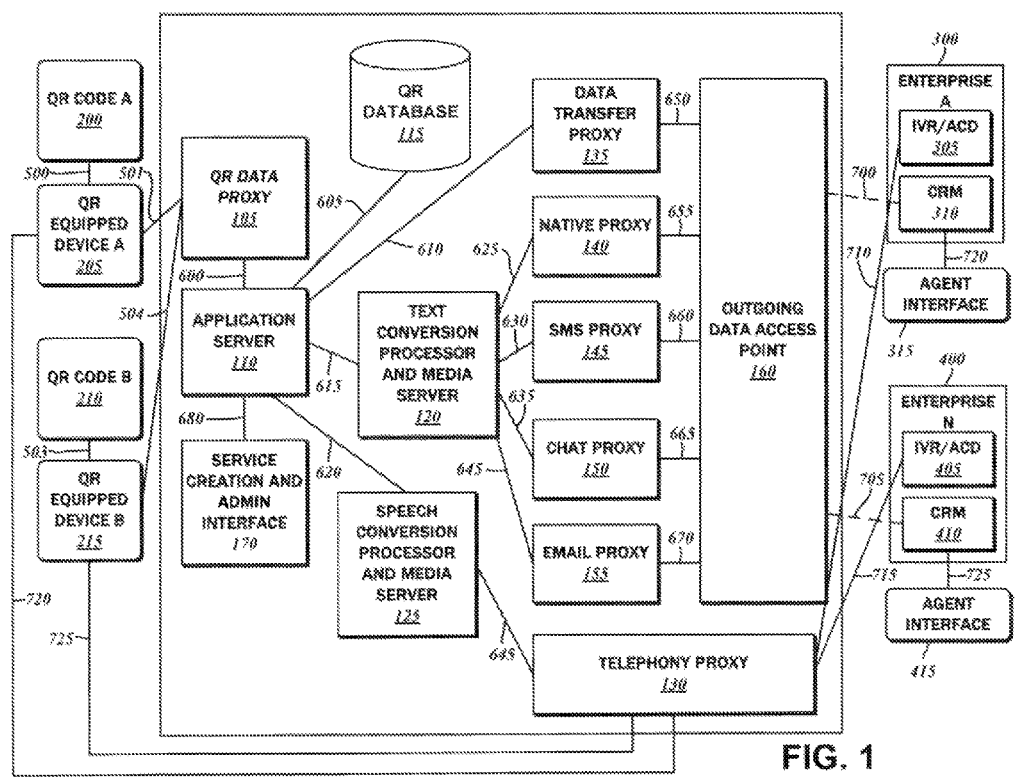
FIG. 1 is a block diagram illustrating one embodiment of a quick response (QR) data proxy and protocol gateway in accordance with one embodiment of the present disclosure.

With reference to the block diagram of FIG. 1, a quick response (QR) data proxy and protocol gateway 100 interacts with a plurality of QR Tags, QR-enabled devices, and a plurality of enterprises. In particular, the gateway 100 is comprised of a QR proxy 105, an application server 110, a QR database 115, a text conversion processor 120, a speech conversion processor 125, a data transfer proxy 135, a native proxy 140, a short message service (SMS) proxy 145, a chat proxy 150, and email proxy 155, a telephony proxy 130, and an outgoing data access point 160. The gateway has input ports to receive QR scans and user data and output ports to facilitate highly personalized and preference-based transactions on behalf of the consumer. Such transactions may include automated purchases, credits, shipping instructions, personal preference information such as color and size of a product, shipping information and customer service profile information that can be used in the establishment of real time and non-real time sessions between the consumer and a customer service agent.

Accordingly, a QR code A 200 and a QR-equipped device A 205 connect to the QR data proxy 105 over communications channels 500 and 501, respectively. Likewise, the gateway 100 can process a plurality of QR codes and connect to a plurality of QR-equipped devices including, but not limited to a QR code B 210 and a QR-Equipped device B 215 also connected to the QR data proxy 105 over communications channels 503 and 504, respectively. In a preferred embodiment of the invention, such communications facilities will be internet, IP, or cellular-based and will convey information over HTTP or HTTPS. In an alternate embodiment, such facilities may be proprietary in nature, bearing information conveyed over private networks.

QR codes, which are established as an ISO/IEC18004 standard, and similar bar codes such as produced by ShareSquare, JagTag, Esponce, and Liqueo may be interpreted by associated devices and applications by converting the visual data into computer-actionable text that can be used to instruct downstream devices. Such devices are typically agent consoles in which agents are able to view customer service-based information that has been filtered by automated software. In this scenario, The QR data proxy 105 captures the stream of data from QR Code A 200 via the QR-equipped device 205 over data communications channels 500 and 501.

A program running in the QR-equipped device 205 may be used to pre-process both the QR code and consumer-specific data before reaching the QR data proxy 105. Alternatively, the QR code data may be passed to the QR data proxy 105 by the QR-equipped device 205 with a simple consumer identifier (such as a phone number or customer code), such that the application server 110 and the QR database 115 can be used to synchronize the QR code data with consumer preferences and personal data downstream.

Such consumer data may have information embedded therein such as routing tags, consumer preference tags, consumer private data, or other attributes that may be useful in processing customer service-related information for further processing or disposition. Here, the QR data proxy 200 is used to parse, inject, and format consumer-related data based on information supplied by templates that are pre-defined in the QR database 115. The application server 110 is used to decide what templates and what subsequent actions are taken depending on the incoming QR data and consumer-related streams.

The QR-equipped devices A 205 and B 215 may convey consumer-specific information that is embedded inside of proprietary software, such as smartphone devices, private enterprise web sites, or other proprietary devices. Such devices can be programmed to transmit consumer preference and privacy information, including consumer sentiment, which can be filtered and tagged by the QR-equipped devices A 205 B 215. In this scenario, the QR data proxy 105 captures the stream so it may be associated with pre-stored templates and consumer-specific preferences.

Again, such data may have embedded therein information such as routing tags, consumer preference tags, product tags, or other attributes that may be useful in processing customer service-specific data for further processing or disposition. The QR data proxy 200 is used to parse, inject, and format consumer-specific data based on information supplied by templates that are pre-defined in the QR database 115. The application server 110 is used to decide what templates and what subsequent actions are taken depending on the incoming QR data and consumer-specific data streams.

The application server 110 is connected to the QR data proxy 105 over a communication channel 600. This may be an IP communication channel, or a proprietary channel. Likewise, the application server 110 is connected to the QR database 115 over a communications channel 605. Typically, this may be implemented as a JDBC access method, SQL Query, Stored Procedure Call, or a variety of proprietary methods for database communications. Such a QR database 115 may be local or remote in a various embodiments of the invention.

The application server 110 is also connected to the data transfer proxy 135 over a 610 communication channel 610. Such a communication channel can be an IP connection, HTTP (Hyper Text Transfer Protocol), REST (Representational State Transfer) or other means to send signals and data. The application server 110 is also connected to the text conversion processor and media server 120 over a communication channel 615. Similarly, such a communication channel can be an IP connection, HTTP, REST, or other means to send signals and data. Furthermore, the application server 110 is connected to the speech conversion processor and media server 125 over a communication channel 620. Such a communication channel can be an IP connection, HTTP, REST or other means to send signals and data.

Moreover, the application server 110 is connected to the service creation and administration interface 170 over a communications channel 680, which is used to set up scripts and templates, associate QR codes with consumers, associate scripts and templates with enterprise customer service systems, run reports, define preferences for generating native QR codes and related associations, and for general administration of the system. In a preferred embodiment of the invention, the interface will be a web-based interface using HTTP, Java and other languages, protocols and programming languages that are commonly available to those having ordinary skill in the art.

The QR database 115 stores a variety of information relating to text or speech conversion protocols, social attribute tag data, routing and destination data, timing threshold information, consumer preference, privacy and other attributes stored in templates, and other data that aid in the processing and disposition of QR data and consumer preference data. Templates are stored in the QR database 115 that define predetermined routines for processing consumer-specific media streams. User interfaces may be represented on web pages and subsequently allow for storage of user-typed data to be stored in templates inside of a database. Such templates can be created by the network provider of the gateway 100, or, with the proper security, by enterprise A users 300 or enterprise N users 400. The application server 110 can be used to govern the communications with the QR database 115 in the case of its access being allowed for enterprise users.

The text conversion processor and media server 120 receives incoming QR code data and consumer information and re-formats the same into a standard text payload. Those having ordinary skill in the art will recognize email header and addressing information. Assuming the routing and destination data in a stored template in the QR database 115 calls for the QR code data to be converted into an email, the text conversion processor and media server 120 will parse the data, create a MIME (Multipurpose Internet Mail Extensions) header, and embed all of the requisite addressing information into the item. In a preferred embodiment, the "sender" address may be spoofed in such a way as to use the telephone number of the QR equipped device A 205 or B 215, or the identifier of the application as the originating user. Preferably, such an identifier will be matched with data in the QR database 115 and translated into an originating email address.

Likewise, if a response back to the consumer is required, the text conversion processor and media server 120 may be used in reverse, so as to dis-assemble an email and re-construct a HTTP or REST-based stream of data suitable for transmitting back to the QR equipped device A 205 or B 215 in the same format as the original, incoming data stream from those devices.

The text conversion processor and media server 120 can convert media streams into any text-based format. For example, in the case of a chat conversion, the original media stream can be parsed much like an email, but instead of a MIME address conversion, the text conversion processor and media server 120 will instead put the media into the form of a chat request. Such a chat request can be directed to an enterprise chat server using SMPP (Short Message Peer to Peer) or other common protocols. Likewise, and SMS conversion can spoof destination addresses with an SMS short code and routing information that is suitable for reading by an SMS gateway.

The speech conversion processor and media server 125 receives the incoming media stream information and re-formats the same into a standard speech payload. Text-to-speech conversion utilities such as those available from Nuance Communications are known in the art. Such utilities are able to read text and synthesize a spoken word equivalent.

In an alternate embodiment, the routing and destination data in a stored template in the QR database 115 calls for the originating data stream from the QR equipped device A 205 or B 215 to be converted into speech. Here the speech conversion processor and media server 125 will parse the data, create a SIP (Session Initiation Protocol) header, and embed the requisite addressing information into the item. In a preferred embodiment, the "sender" address may be spoofed in such a way as to speak the handle or pseudo-name of the consumer as the "caller." Alternately, if the QR equipped device A 205 or B 215 is part of a SmartPhone, the phone number can be used as the originating address. Likewise, if a response back to the consumer is required, the speech conversion processor 125 may be used in reverse, so as to take the spoken word of an enterprise agent and re-construct it into a text stream in a format suitable for rendering onto the QR equipped device A 205 or B 215.

The speech conversion processor and media server 125 is connected to the telephony proxy 130 over a communications channel 165. In a preferred embodiment, such the communication channel 165 may be in the form of a SIP-based communication, using an MRCP (Media Resource Control Protocol) protocol to control the text-to-speech or speech-to-text conversion. Likewise, an RTP (Real Time Protocol) communication channel and a separate SIP channel for control may be used for the speech conversion processor and media server 125 to communicate to the telephony proxy 130.

Commonly available tools such as FreeSwitch and the SOPHIA SIP Stack can be used along with commonly available hardware from Dialogic Corporation or Sangoma Corporation to build the telephony proxy 130. It is contemplated that the telephony proxy 130 receives the SIP header information, the content from the QR code and QR equipped device software, and conveys each via phone call to the enterprise A 300 or enterprise N 400 systems over communication facilities 710 and 715, respectively. In addition, the telephony proxy 130 can be used to conference calls between the enterprise A 300 or enterprise N 400 systems and the QR equipped device A 205 or the QR equipped device B 215, both of which, in a preferred embodiment, would be co-resident with a SmartPhone. Such communications facilities may be PSTN (Public Switched Telephone Network) or VoIP (Voice over IP) facilities. This is easily achieved, as the telephony proxy 130 can be equipped with PSTN/VoIP conversion apparatus to serve either type of network interface. The telephone calls made by the telephony proxy 130 are processed by the telephone answering and routing apparatus deployed by that particular enterprise, i.e., the IVR/ACD 305 of enterprise A 300 or the IVR/ACD 405 of enterprise N 400. The templates stored in the QR database 115 can be used to navigate the telephony-based menuing system in order to disposition the calls to the appropriate Agent.

Should agent and consumer telephone communication be required, the telephone proxy 130 will create connections between the agent interface 315 or 415 to the QR equipped device A 205 or the QR equipped device B 215. Once routed, the IVR/ACD 305, 405 will send the calls to the agent interface 315 or 414 over communications channels 720 or 725, respectively. Such communications channels will be dependent on the IVR or ACD deployed by the enterprise. Via the telephone proxy 130, these communication channels, in the case of agent-to-consumer conferences, will be connected to communications channels 720 and 725 in order to connect to the QR equipped device A 205 or the QR equipped device B 215.

Contemporaneously to the calls being placed by the telephony proxy 130, the outgoing data access point 160 may convey coordinating signals over communication channels 700 or 705 to the CRM 310 or the CRM 410, respectively, also respectively on behalf of the enterprise A 300 or the enterprise N 400. Such a communication will be well known to the common practitioner of CTI (Computer Telephone Integration) using commonly available protocols from vendors such as AVAYA or Cisco, for example. In an alternate embodiment, such communications links may also be achieved without CTI per se, but rather by communicating directly to a desktop software in the agent interface 315 or 415.

The outgoing data access point derives its communications payload, media and routing information from the data transfer proxy 135, which is controlled by the application server 110. In further detail, the application server 110 is understood to use the template data stored in the QR database 115 to instruct the data transfer proxy 135 how to assemble coordinating routing and destination data, along with any appropriate QR Code or consumer preference data, such that it can assemble information in the appropriate target CTI or proprietary format for any given enterprise.

The native proxy 140, the SMS proxy 145, the chat proxy 150, and the Email proxy 155 are all similarly situated as the data transfer proxy 135 with respect to the outgoing data access point 160. In some cases, the relevant routing, attribute, payload and destination information may be embedded in the media as with an email. Emails, for example, have origination, destination, subject and body. QR Code, consumer preference data, and other relevant data may be stored in the subject line for downstream processing.

Likewise, the QR Code, consumer preference data, and other relevant data may be inserted into the body of the email. Such data, including the origination, destination and other attributes may be enough to process the information in an enterprise email routing and distribution system. Such systems are available from Oracle and Avaya, for example. In the case of a communication not having all of the relevant routing, destination, or other attributes available in the payload or header of the communication, the data transfer proxy 135 can be of particular utility in contemporaneously transmitting such data out-of-band while the message payload is delivered over a commonly available medium.

Figure 2:
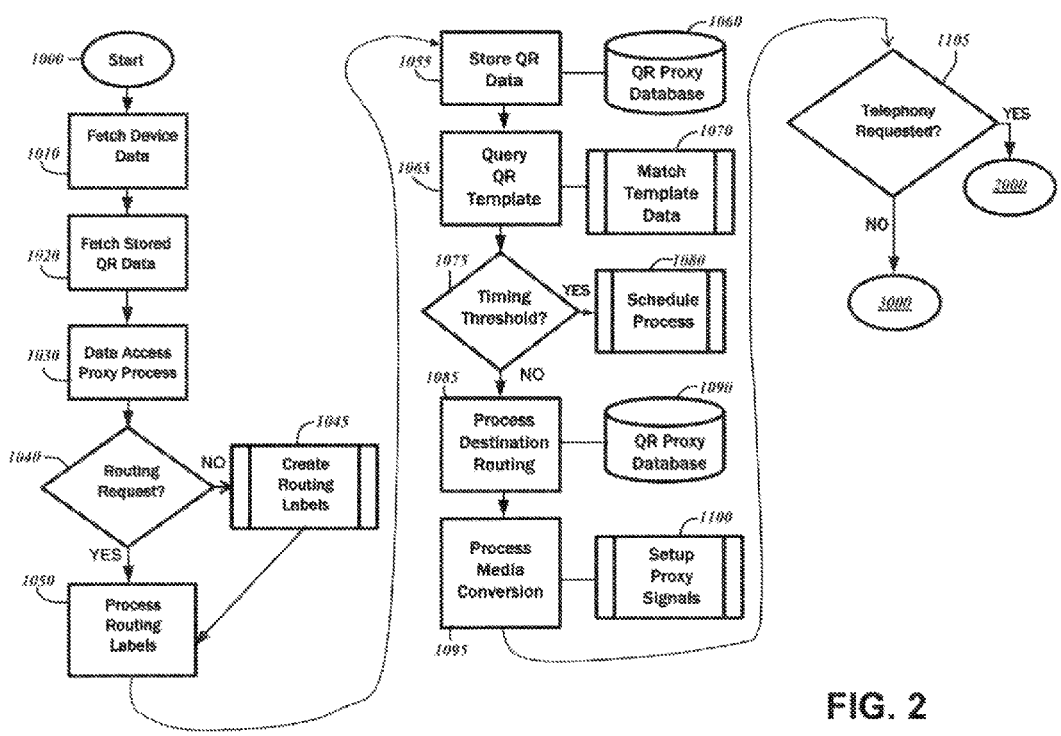
FIG. 2 is a flowchart showing the steps of receiving, labeling, and storing of incoming QR data.

Referring now to FIG. 2, another embodiment of the present invention directed to a method for gathering, labeling and storing QR data is contemplated. At a beginning 1000, QR data 200 is extracted from a QR code and interpreted via a QR code equipped device 205, such as a Smartphone or other proprietary device. Then, at step 1010, the QR gateway 100 fetches both the QR code data and consumer preference and other information from the application running on the QR code equipped device 205. This data may be raw, unfiltered data, or it may be pre-processed by commercially available QR code software, such as software available from Esponce or Liqueo. Likewise, such QR code and consumer preference and other data may be pre-processed by a decisioning engine, or natural language processing engine. Next, in a step 1020, other data, including routing information or consumer preference templates and destination information is fetched. In a step 1030, the gateway 100 uses its data access point process to parse the text from the QR code 200 in order to identify any routing, origination, tag information or intelligent attributes that may be used in its disposition.

At a decision branch 1040, gateway 100 determines if a pre-determined routing request has been logged and identified for the type of QR code data and personal preference data, or other intelligence fetched. This data is stored in a template in the database 115 of the gateway 100. If there is no routing data, the method proceeds to step 1045 where default routing rules are used based on available data in the QR code or consumer preference templates. If routing information is available that matches with the pre-defined templates, the method proceeds to step 1050 where the appropriate routing labels and other data are tagged to the QR code data to determine which type of communication the QR code and personal preference data will be converted to downstream.

Following the aforementioned step 1050, the method continues with a step 1055 in which the gateway 100 stores the QR code data by accessing the QR proxy database 115 per step 1060. Such data may be used as an archive or for purposes of store-and-forward for redundancy and recovery. In a step 1065, the gateway 100 further queries the pre-defined QR code and consumer preference template and loads that data into memory. Then, at a step 1070, the application server matches the stored template data with the attributes of the QR code data.

In a decision branch 1075, the timing threshold attribute is inspected to ascertain the importance or priority of the QR code data based on attributes stored in the QR code data template. If timing thresholds are defined, the QR code data is scheduled for action at step 1080. This may be as simple as a one hour or two-hour delay or a delay for several minutes depending on the preferences of the enterprise that the gateway 100 is serving.

Continuing on, at a step 1085 the gateway 100 processes all of the relevant attributes required for destination routing of the QR code Data. Then, at step 1090 the database 115 may be queried for default routing information not stored in the template. At a step 1095 the application server 110 determines the type of media conversion requested in the template and loads the appropriate parsing, addressing, and content data based on pre-defined protocols 1100. The application server hands this data off to the text conversion processor and media server 120 and the speech conversion processor and media server 125 as appropriate, depending on the medium required by the enterprise. At a decision branch 1105 the gateway 100 determines if telephony treatment is required. If so, the process continues with a step 2000 as set forth in FIG. 3. If no telephony treatment is required, the process continues at step 3000 as depicted in FIG. 4.

Figure 3:
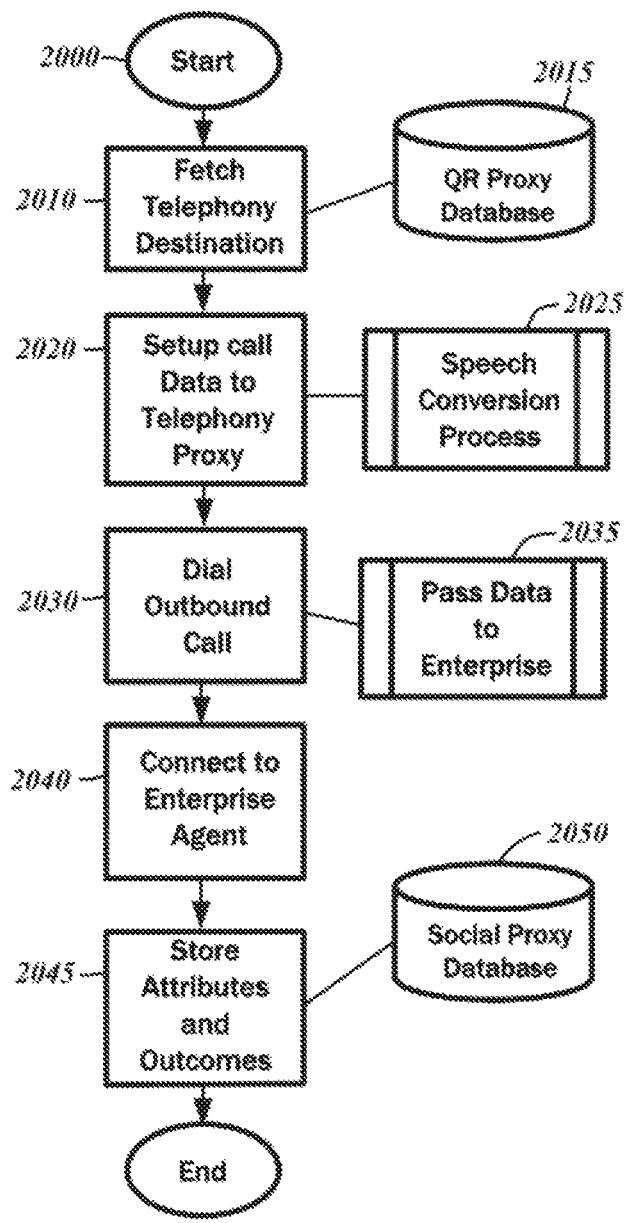
FIG. 3 is a flowchart showing the steps of telephony conversion in accordance with an embodiment of the present disclosure.

As indicated above, the flowchart of FIG. 3 depicts the telephony conversion routine. The method starts at a step 2000 after the gateway has determined telephony treatment is required to disposition the QR code data stream. Then, at step 2010, the gateway 100 fetches the telephony destination information required to make a phone call to the target enterprise. The database 115 may be queried at a step 2015 for default telephony routing information. At step 2020, the gateway 100 begins to set up a telephone call with all of the relevant origination information (quasi-ANI) and destination information (quasi-DNIS). At step 2025, the system converts text to speech to prepare the content of the telephony call. At step 2030, the gateway 100 performs an outbound call to the Enterprise IVR/ACD. Contemporaneously, any data that is relevant to the call may be passed to the enterprise over a data link at step 2035.

After dialing the call, at a step 2040, a connection is made to the enterprise agent, based on the native routing capabilities of the IVR/ACD of that enterprise. The agent will hear the transcribed QR code data in the form of the spoken word. Alternately, the data can come to the agent via a CTI screen pop via the data transfer proxy. Here, the agent will take appropriate action such as looking up the person in the CRM database, adding comments, or making an outbound communication over a customer-preferred communication channel. In the case of an outbound communication, the telephony proxy 130 will connect the agent to the QR code equipped device controlled by the consumer. The information entered by the agent in response to, or in recognition of the QR code data stream and consumer preferences, will be stored in the database 115 of the gateway 100 in accordance with a step 2050. Alternately, such data may be stored in the enterprise database. Alternately such data may be stored in the database 115 of the gateway 100 and the enterprise database.

Figure 4:
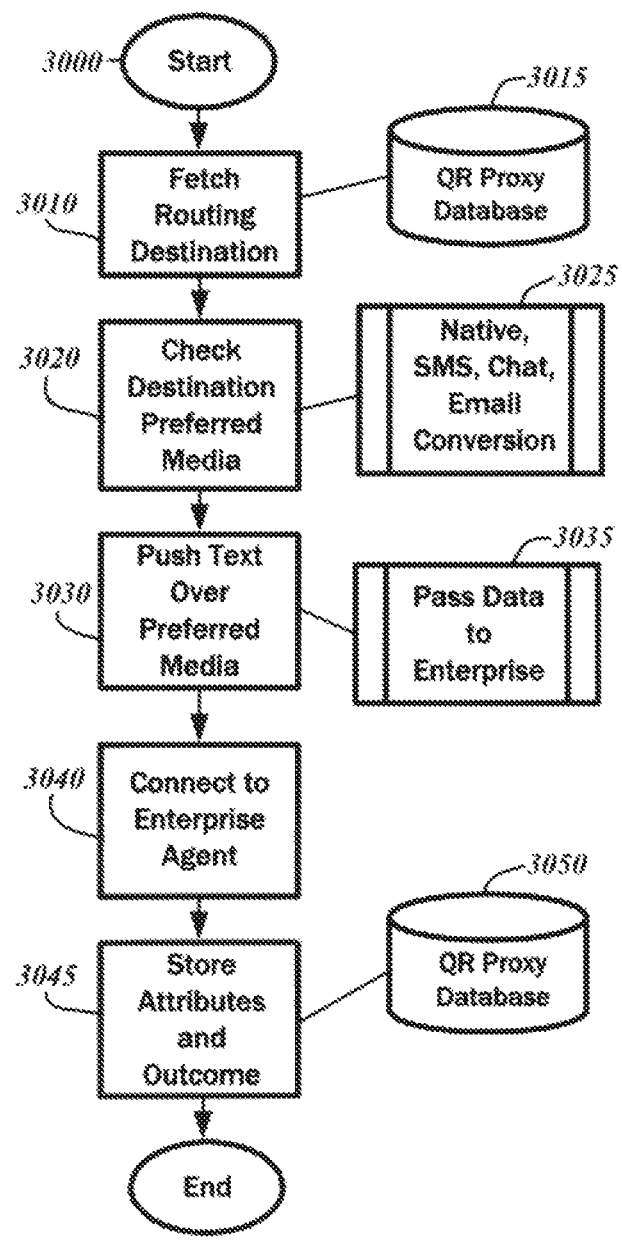
FIG. 4 is a flowchart showing telephony conversion according to one embodiment.

Referring now to FIG. 4, a text conversion routine in accordance with various embodiments of the present disclosure will now be considered. The method starts at a step 3000 after the gateway 100 has determined text conversion treatment is required to disposition the QR code data stream. At step 3010, the gateway 100 fetches the QR code data destination information required to send native data, or a chat, or an email, or an SMS to the target enterprise. The database may be queried at a step 3015 for default media routing information. Next, at a step 3020, the gateway 100 begins to set up a native send, or a chat, or an SMS, or an email, with all of the relevant origination information (quasi-ANI) and destination information (quasi-DNIS). At step 3025, the system converts the QR code data stream into the appropriate text format for a native send, or a chat, or an SMS, or an email. Then, at a step 3030, the gateway 100 pushes the preferred communication (i.e. native send, or a chat, or an SMS, or an email) to the enterprise IVR/ACD. Contemporaneously, any data that is relevant to the call may be passed to the enterprise over a data link at a step 3035.

Thereafter, a connection is made to the enterprise agent in accordance with a step 3040. This connection may be based on the native routing capabilities of the IVR/ACD of that enterprise. The agent will see the transcribed QR code data in the form of a native send, or a chat, or an SMS, or an email, as stipulated by the template taken from the gateway 100 database 115. Here the agent will take appropriate action such as looking up the person in the CRM database, adding comments, or making an outbound communication over a customer-preferred communication channel. Such an outbound communication can be facilitated jointly by the text conversion processor and media server 120 and the QR data proxy 105 in the case of non-speech media, or by the speech conversion processor and media server 125 and the telephony proxy 130 in the case of speech-based communication.

At a step 3050, the information entered by the agent in response to, or in recognition of the QR code data stream and consumer preferences, will be stored in the database 115 of the gateway 100. Alternately, such data may be stored in the enterprise database. Alternately such data may be stored in the database 115 of the gateway 100 and the enterprise database.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An encoded image communications portal system for converting the scanning action by a first party of a machine-readable optical image to a human understandable written or voice message for transmission to a different party, the system comprising:

computer hardware configured as a data proxy, the data proxy configured to receive from a user device personal user data and computer-actionable text derived from a machine-readable optical image read by the user device, wherein the machine-readable text is related to a particular item;

non-transient computer readable media having a database with a plurality of templates stored thereon, each template defining a different computer routine for generating a human understandable message based on the received personal user data and the computer-actionable text derived from the machine-readable optical image;

computer hardware configured as an application server, the application server configured to query the database for a selected one of the templates based on the personal user data and the computer-actionable text derived from the machine-readable optical image, and to generate the human understandable message using the selected template;

wherein the application server utilizes a speech conversion processor and media server configured to generate a human understandable voice message when the template directs that a voice message is to be generated;

wherein the application server utilizes a text conversion processor and media server configured to generate a human understandable written message when the template directs that a written message is to be generated;

computer hardware configured as an outgoing data access point, the data access point configured to transmit the human understandable written message to a contact center resource; and computer hardware configured as a telephony proxy, the telephony proxy configured to transmit the human understandable voice message to the contact center resource.

2. The system of claim 1, wherein the human understandable written message is transmitted as a formatted data stream generated in accordance with the selected template.

3. The system of claim 2 wherein the formatted data stream is a. native data stream specific to the contact center resource.

4. The system of claim 2, wherein the formatted data stream is a Short Message Service (SMS) message.

5. The system of claim 2, wherein the formatted data stream is an Instant Message (IM).

6. The system of claim 2, wherein the formatted data stream is an e-mail message.

7. The system of claim 1, herein transmission of the human understandable voice message to the contact center resource is via a telephone call.

8. The system of claim 1,
wherein the encoded image communications portal system is configured to utilize the outgoing data access point to detect, from the contact center resource, a response to the outgoing message;
wherein upon detection of the response from the contact center resource the encoded image communications portal system is configured to utilize the telephony proxy to bridge communication between the contact center resource and the user device.

9. The system of claim 1, wherein the encoded image communications portal system is configured to utilize both outgoing access point and the telephony proxy to communicate contemporaneously with the contact center resource.

10. The system of claim 1, wherein the database includes additional user data associated with the user data received from the user device, and wherein the output data is generated b further processing the additional user data.

11. The system of claim 1, where in the encoded image is a Quick Response (QR) code.

12. The system of claim 1, wherein the contact center resource comprises an interactive voice response system or automatic contact distributor system.

* * * * *